United States Patent Office 3,594,336
Patented July 20, 1971

---

3,594,336
PROCESS FOR THE PREPARATION OF AQUEOUS POLYMERIZATE DISPERSIONS OF UNSATURATED MONOMERS
Eduard Bergmeister and Hubert Wiest, Burghausen, Upper Bavaria, Germany, assignors to Wacker-Chemie GmbH, Munich, Germany
No Drawing. Filed May 8, 1968, Ser. No. 727,693
Claims priority, application Germany, Sept. 20, 1967, W 44,815
Int. Cl. C08f 15/20
U.S. Cl. 260—17R          3 Claims

---

ABSTRACT OF THE DISCLOSURE

The invention relates to a process for the preparation of aqueous polymerizate dispersions which comprises the steps of effecting a dispersion polymerization of free-radical polymerizable organic compounds in the presence of 0.6% to 4% by weight of the polymerizates of N-vinylpyrrolidone, 0.1% to 8% by weight of non-ionic emulsifiers and from 0% to 1% by weight of anionic emulsifiers characterized in that about 0.1% to about 0.8% by weight of a water-soluble hydroxyalkyl cellulose is additionally present in the polymerization recipe, where all the above percentages are percentages by weight with reference to the weight of the free-radical polymerizable organic compounds present in the polymerization recipe.

---

THE PRIOR ART

It is known that through so-called "dispersion polymerization" of free-radical polymerizable organic compounds, aqueous polymerizate dispersions can be prepared. (See Schildknecht "Polymer Processes," Interscience Publishers, Inc., New York, 1956, pages 105 to 109 or Houwink "Chemie und Technologie der Kunststoffe," Akademische Verlagsgesellschaft Geets und Postig, K.G., Leipzig, 1956, vol. II, page 57.) The present invention concerns itself with a new and unexpected combination of dispersing agents for dispersion polymerization, which sometimes is referred to as "a process for the preparation of aqueous latex-like polymerizate dispersions," as well.

Polyvinylpyrrolidone has previously been referred to as one of these dispersion agents tested already in the dispersion polymerization process. Those polymerizate dispersions so far prepared with the help of this protective colloid as sole dispersion agent, however, contain bead-like components and undesired agglomerates and are very unstable on application of mechanical stress, so that often they coagulate already during the polymerization. Other disadvantages of polymerization dispersions containing poly-N-vinylpyrrolidone as sole dispersion agent are given in the German Auslegeschrift 1,206,592.

It is also known that through combined usage of polyvinylpyrrolidone and non-ionic emulsifiers as well as possibly anionic emulsifiers, dispersions are obtained in the preparation of aqueous polymerizate dispersions from vinyl acetate or mixtures of vinyl acetate with vinyl butyrate or esters of unsaturated mono- or dicarboxylic acids which, with a low content of plasticizers, dry to give flexible films. However, it has been found that these dispersions if subjected to great mechanical stress, as occurs in the mixing with pigments, suffer a considerable permanent decrease of viscosity. Furthermore, it was found that those dispersions are only free from bead-like components and only dry to speck-free films when they contain as a dispersed polymerizate, mixed polymerizates of vinyl acetate and certain maleic acid esters.

OBJECTS OF THE INVENTION

An object of the invention is the obtention of polymerizate dispersions which are medium to highly viscous, freeze-stable, free from bead-like components and undesirable agglomerates and which dry to films free of specks and more stable against water spotting.

Another object of the invention is the development of a process for the preparation of aqueous polymerizate dispersions comprising the steps of effecting a dispersion polymerization of free-radical polymerizable organic compounds in the presence of 0.6% to 4% by weight, based on the weight of said polymerizable organic compounds, of a polymerizate of N-vinylpyrrolidone, 0.1% to 8% by weight, based on the weight of said polymerizable organic compounds, of non-ionic emulsifiers and from 0% to 1% by weight, based on the weight of said polymerizable organic compounds, of anionic emulsifiers, and recovering said aqueous polymerizate dispersions, the improvement which consists of effecting said dispersion polymerization in the presence of about 0.1% to about 0.8% by weight, based on the weight of said polymerizable organic compounds, of a water-soluble hydroxyalkylcellulose.

A further object of the invention is the obtention of said aqueous polymerizate dispersions produced by the above improved process.

These and other objects of the invention will become more apparent as the description thereof proceeds.

DESCRIPTION OF THE INVENTION

By means of the process of the invention, the above objects can be achieved and polymerizate dispersions can be prepared which are free from those disadvantages described above. Through the process of the invention polymerizate dispersions are prepared which are medium to highly viscous, freeze-stable, free from bead-like components and undesired agglomerates and dry to films free from specks, even when they contain as dispersed polymerizates others than mixed polymerizates from vinyl acetate and maleic acid esters. The dispersed polymerizates of the invention also, under the influence of mechanical stresses as occur during the polymerization or on repumping or during their admixture with fillers and/or pigments upon the preparation of paints, do not coagulate or suffer a large permanent decrease of viscosity. The polymerizate dispersions of the invention possess, in addition, a great ability to bind pigments and a very high structural viscosity, that is, the viscosity of the dispersions drops interdependently with increasing shearing stress and goes up as soon as the shearing stress is discontinued, combined with thixotropy, that is, the viscosity of the dispersions decreases according to the shearing stress in order to increase again upon the discontinuation of the shearing stress. In addition, the polymerizate dispersions of the invention dry to films free from specks which to a lesser degree water spot to become white-coated than films from many of the polymerizate dispersions known so far.

The subject matter of the invention is a process for the preparation of aqueous polymerizate dispersions which comprises effecting a dispersion polymerization of free-radical polymerizable organic compounds in the presence of 0.6% to 4% by weight of the polymerizates of N-vinylpyrrolidone and 0.1% to 8% by weight of non-ionic emulsifiers as well as possibly from 0% up to 1% by weight of anionic emulsifiers, characterized in that about 0.1% to 0.8% by weight of a water-soluble hydroxyalkylcellulose is additionally present in the polymerization recipe. All percentages recited above are based on the weight of organic compounds which are to be polymerized.

The term "hydroxyalkylcelluloses" is to be taken to include hydroxyalkylmethylcelluloses as well.

Within the framework of the present invention, any monomer can be employed as a free-radical, polymerizable organic compound which up to the present had previously been employed in dispersion polymerization. These are monomers or mixtures of monomers which, through polymerization in water are transformed to solid products at room temperature which solid products are not or only slightly soluble in water. Examples for such monomers are especially vinyl esters of straight or branched-chain monocarboxylic acids with 2 to 18 carbon atoms preferably alkanoic acids, such as vinyl acetate, vinyl propionate, vinyl butyrate, vinyl laurate, vinyl stearate, vinyl pivalate, vinyl esters of commercially obtained mixtures of aliphatic, branched in the α-position with respect to the carboxyl group, having 9 to 11 carbon atoms per molecule, saturated monocarboxylic acids and vinyl ester of commercially obtained isomeric mixtures of alphatic, branched in the alpha position with respect to the carboxyl group, with —$CH_2$— groups, having 9 or 10 or 13 carbon atoms per molecule, saturated monocarboxylic acids, as obtained through oxidation of products prepared according to the oxo synthesis. Furthermore, the monomers include vinyl esters of inorganic acids such as vinyl chloride and vinylidene chloride; acrylic compounds such as acrylic acid, esters of acrylic acid and methacrylic acid, such as the lower alkyl esters, for example, methyl acrylate and methyl methacrylate, acrylamide and N-methylolacryamide; unsaturated dicarboxylic acids, for example, alkenedioic acids and cycloalkenedioic acids, such as maleic acid, fumaric acid, methylene malonic acid, itaconic acid, citraonic acid or tetrahydrophthalic acid and the mono and diesters of these unsaturated dicarboxylic acids with alkanols, such as mono-(2-ethylhexyl) maleate, di-(2-ethylhexyl) maleate and dilauryl fumarate, as well as olefins, such as ethylene, butadiene and styrene. Preferable as free-radical polymerizable organic compounds within the framework of the process of the invention are vinyl acetate and mixtures of vinyl acetate and vinyl esters of straight or branched alkanoic acids having 4 to 18 carbon atoms and/or vinyl chloride and/or ethylene. If such mixtures contain vinyl chloride, then the amount of vinyl chloride should not exceed 30% by weight, based on the total weight of the mixture of compounds to be polymerized, particularly if, at the same time, vinyl esters of higher alkanoic acids are present.

In the process of the invention, all polymerization catalysts which, so far, have been employed in the dispersion polymerization or could be so employed, can be used as polymerization catalysts. At least, if redox systems are not used as catalysts, this refers to water-soluble free-radical formers, such as hydrogen peroxide, potassium persulfate, ammonium persulfate, sodium perborate, sodium percarbonate, 2,2′-azobis-(2-methyl-4-carboxybutyronitrile) and tert.butylhydroperoxide. Also those free-radical formers, as well, can be preferably employed in the common redox systems, that is, in connection with reducing agents, such as ascorbic acid, tartaric acid, hydroxylamine, sodium formaldehyde-sulfoxylate, iron-(II) salts, hydrogen in connection with colloidally divided noble metals, sodium dithionite or sodium hydrogen sulfite. If monomer-soluble, free-radical formers or free-radical formers which are both monomer as well as water-soluble as, for instance, tert.-butylhydroperoxide are employed, then water-soluble reducing agents must be employed in addition in order to avoid pearl polymerizates. The polymerization catalysts are employed according to amounts commonly utilized for dispersion polymerization, preferably 0.005% to 1% by weight, based on the entire weight of the organic compound to be polymerized.

The amount in weight of the compounds which are to be polymerized to the total weight of these compounds plus water is in the range common for dispersion polymerizations, that is, at approximately 30% to 70% by weight.

Due to its easy accessibility and for the reason that excellent results can thus be obtained, the use of homopolymerizates of N-vinylpyrrolidone as the polymerizate of N-vinylpyrrolidone is preferred. If desired, well known mixed polymerizates of N-vinylpyrrolidone can be used in place of such homopolymerizates or in place of a part of such homopolymerizates, which are employed as protective colloids. Examples for such mixed polymerizates are mixed polymerizates of N-vinylpyrrolidone with methyl or ethyl esters of acrylic or methacrylic acid, vinyl acetate, vinyl propionate, dimethyl or diethyl maleate, and subsequently heated mixed polymerizates of N-vinylpyrrolidone and unsaturated carboxylic acid amides.

These polymerizates of N-vinylpyrrolidone employed within the framework of the process of the invention are those whose polymerization degrees are normally such as to allow their application as protective colloids and have, for instance, K-values (see Fikentscher "Cellulosechemie," vol. 13, 1932, page 58) in the range of from 30 to 90. Known polymerizates of N-vinylpyrrolidone of different polymerization degrees may also be used.

Preferably the polymerizates of N-vinylpyrrolidone are employed in larger weight amounts than the amount of hydroxyalkyl celluloses used.

Examples for non-ionic emulsifiers are block-mixed polymerizates of ethylene oxide and propyleneoxide, for example, block polymerizates of 10 mols of ethylene oxide and 30 mols of propyleneoxide; as well as reaction products of from 4 to 100 mols of ethyleneoxide with 1 mol of organic compounds having at least 8 carbon atoms and containing active hydrogen atoms, which compounds are those which on the Zerewitinoff reaction release free hydrogen. These organic, active hydrogen-containing compounds having at least 8 carbon atoms may be, for example, carboxylic acids, hydroxycarboxylic acids, alcohols, alkylphenols, carboxylic acid amides or primary or secondary amines. As an example of the corresponding reaction products of such organic compounds with ethyleneoxide, the reaction products of 1 mol of nonylphenol and 8 to 50 mols of ethyleneoxide or of 1 mol of oleyl alcohol and 20 mols of ethyleneoxide can be mentioned. Mixtures of known different non-ionic emulsifiers may also be employed.

Examples of anionic emulsifiers are alkali metal and ammonium salts of secondary alkane sulfonic acids having 10 to 18 carbon atoms; of acid esters of alkanols having 9 to 18 carbon atoms, and sulfuric acid, for example, sodium laurylsulfate; of alkylarylsulfonic acids; of sulfonated polyoxyethylene ethers of alkylphenols; and of dialkyl esters of sulfosuccinic acid. Mixtures of different anionic emulsifiers may also be used.

Of the water-soluble hydroxyalkylcelluloses, water-soluble hydroxyethyl-, hydroxypropyl-, hydroxyethylmethyl- and/or hydroxypropylmethyl - celluloses are preferred. The water-soluble hydroxyalkylcelluloses employed within the framework of the process of the invention have the same viscosities as those which hydroxyalkylcelluloses used as protective colloids normally have. These viscosities lie within the range of 6 to 1000 cp., especially 50 to 500 cp., as measured with a 2% by weight aqueous solution at 20° C. in the Hoppler viscosimeter. Mixtures of hydroxyalkylcelluloses of different viscosity may also be employed.

If more than 0.8% by weight, based on the weight of the compounds to be polymerized, of hydroxyalkylcelluloses are used, then the polymerization dispersions do not possess a high structure viscosity, combined with thixotropy and films prepared from those dispersions are coated white by water more easily.

The higher the viscosity of polymerization dispersions to be prepared in accordance with the invention is to be, the higher the polymerization degree of the polyvinylpyrrolidone and the viscosity of the hydroxyalkylcelluloses should be.

Preferably, the pH value should be in a range from 3 to 8 during the polymerization. Usefully, the standardization of the desired pH value is advantageously carried out by initial charging or continuous dosing of weakly basic salts, for example, alkali metal salts of weak acids, such as sodium acetate, sodium bicarbonate and/or sec.-sodium phosphate.

The known chain-terminating compounds, such as aldehydes, chlorinated hydrocarbons, and alkylmercaptans may possibly be used in addition at the usual amounts, that is, from 0.001% to 0.3% by weight, based on the total weight of the polymerization recipe. As is common in the case of dispersion polymerization, the process of the invention is carried out under stirring and exclusion of oxygen.

In order to carry out the polymerization, the entire polymerization receipe may be put into the polymerization vessel at once or individual components of the polymerization recipe, for instance, those compounds which are to be polymerized, or a portion of those components, for instance, a portion of the compounds to be polymerized, can be dosed into the polymerization vessel during the polymerization. If a redox system is used as a polymerization catalyst, then the polymerization rate can be regulated easily through the extent of the amount of reducing agent which is added in small increments.

Usefully, the polymerization is carried out in a temperature range from 20° C. to 120° C. In accordance with one form of carrying out the process of the invention, the polymerization is carried out at first at a constant temperature in the range from 40° C. to 60° C. up to a reaction of 40% to 70% by weight of the entire amount of compounds employed which are to be polymerized, then at temperatures raising to 70° C. to 110° C. during 15 to 60 minutes and finally at a constant temperature within the latter range. The determination of the amount of reaction in the course of polymerization is made according to known methods, for instance, through titration of the compounds to be polymerized, determination of the proportion of polymerizate present, or through measuring of the change in vapor pressure.

The polymerization dispersions prepared according to the invention can be mixed, if desired, with additives such as plasticizers, solvents and natural resins. They can be employed in all cases for which the use of polymerizate dispersions have been recommended so far. Due to their high structure viscosity, combined with thixotropy, the polymerizate dispersions are specially suited as coating agents or else as a base for coating agents. Furthermore, the polymerizate dispersions of the invention are suited as adhesives and other usages, as coatings for cement roofing tiles, in order to prevent efflorescence and as an additive to building materials based upon hydraulically setting masses to increase the bending resistance and abrasion resistance.

The following examples are illustrative of the practice of the invention. They are not, however, to be deemed limitative in any respect.

The properties of those polymerizate dispersions prepared according to the following examples are given in Table I following these examples as far as they were not mentioned in the examples. As a measurement for the degree of structure viscosity, the structure viscosity factor is given in Table I. The structure viscosity factor $f$ results from the equation $$f = \frac{\text{viscosity at 1 revolution per minute}}{\text{viscosity at 10 revolutions per minute}} - 1$$

where the viscosities were each measured at 20° C. in the Brookfield viscosimeter. The structure viscosity factor has the value 0 in the case of a liquid following Newton's law. In those cases of dispersions with a high structure viscosity, the structure viscosity factor is higher than 4.

The viscosities of the protective colloids which are given in the following examples were each measured at 20° C. in the Hoppler viscosimeter.

EXAMPLE 1

A 15-l. pressure vessel equipped with a stirrer, a heat transfer mantle and piping for the introduction of liquids at constant rates and sample taking is utilized. First, 4.6 kg. of water, 50 gm. of poly-N-vinylpyrrolidone with a K-value of 90, 20 gm. of hydroxyethylcellulose with an average 2.3 hydroxyethyloxy groups per glucoseanhydride unit and a viscosity of approximately 300 cp., measured in a 2% by weight aqueous solution, 250 gm. of a polyethyleneglycol ether of isotridecanol (prepared through hydroformylation of tetrameric propylene) with an average of approximately 15 ethyleneoxide units per molecule, and 10 gm. of sodium laurylsulfate were measured into the autoclave and dissolved. After the displacement of the air by nitrogen, a mixture of 2.75 kg. of vinyl acetate, 1.25 kg. of vinyl laurate, 1.25 kg. of vinyl chloride and 13 gm. of tert.-butylhydroperoxide were pumped into the pressure vessel. Under stirring which is continued to the end of the polymerization, the contents of the pressure vessel were warmed to 50° C. and then a solution of 5 gm. of sodium formaldehydesulfoxylate and 11 gm. of sodium carbonate in 500 gm. of water were pumped through a dosage pump at a rate of 70 cm.³ per hour into the pressure vessel. Up to a conversion of 65 weight percent of the entire vinyl compounds employed, the temperature was kept constant at 50° C. Then, within 30 minutes, the temperature was increased to 90° C. and maintained at that temperature until the pressure dropped to 0 atmospheres of excess pressure. The polymerizate dispersion thus obtained was free from beads and other undesired components.

EXAMPLE 2

Into the polymerization device described in Example 1, first 4.7 kg. of water, then 60 gm. of poly-N-vinylpyrrolidone with a K-value of 90, 20 gm. of hydroxypropylmethylcellulose with 0.3 hydroxypropoxy and 1.3 methoxy groups per glucoseanhydride unit and a viscosity of 400 cp., measured in 3% by weight aqueous solution, 150 gm. of a nonylphenol polyethyleneglycol ether with an average of approximately 23 ethyleneoxide units per molecule, 20 ml. of an aqueous 0.1% by weight palladium sol and 1.0 kg. of vinyl acetate were charged. After replacement of the air by nitrogen, the contents of the pressure vessel were heated up to 40° C. under stirring which is continued to the end of the polymerization. Then sufficient ethylene to give a constant pressure of 30 atmospheres of excess pressure is charged into the pressure vessel. A solution of 5 gm. of potassium persulfate in 150 ml. of water was charged as well and through addition of hydrogen under pressure, the pressure in the polymerization device is increased by an additional 5 atmospheres. Finally within a period of 10 hours, a solution of 20 gm. of potassium persulfate in 500 gm. of water and an additional 4.0 gm. of vinyl acetate were added at an even flow rate into the pressure vessel while the temperature was maintained at 40° C. Up to a conversion of 80 weight percent of the vinyl acetate, converted ethylene was replaced by fresh ethylene. The polymerizates of the dispersions thus obtained contained 15 weight percent of ethylene units.

EXAMPLE 3

In the polymerization device described in Example 1, first 3.5 kg. of water, then 30 gm. of poly-N-vinylpyrrolidone with a K-value of 30, 20 gm. of hydroxyethylcellulose as described in Example 1, 300 gm. of the nonylphenol polyethyleneglycol ether with an average of approximately 23 ethyleneoxide units per molecule, 5 gm. of sodium laurylsulfate, 20 gm. of potassium persulfate, 1800 gm. of vinyl acetate and 4200 gm. of di-(2-ethylhexyl)-maleate were charged and mixed thoroughly through stirring. After replacement of the air by nitrogen, the contents of the pressure vessel were heated to 60° C. under stirring, which is continued to the end of the polymerization and then during a period of 10 hours, a solution of 10 gm. of sodium hydrogen sulfite in 500 ml. of water was pumped by a dosing pump into the pressure vessel in an even flow. Three hours prior to the discontinuation of the adding of this solution, 10 gm. of potassium persulfate in 100 ml. of water were charged into the polymerization container. The polymerizate dispersion thus obtained is free from beads and other undesired components.

EXAMPLE 4

First, 4.5 kg. of water, then 60 gm. of poly-N-vinylpyrrolidone with a K-value of 90, 20 gm. of hydroxypropylmethylcellulose as described in Example 2, 200 gm. of nonylphenol polyethyleneglycol ether with an average of approximately 23 ethyleneoxide units per molecule, 8 gm. of sodium bicarbonate, 15 gm. of tert.-butylhydroperoxide, 1.5 kg. of the vinyl ester of a mixture of saturated, aliphatic, branched in the α-position with reference to the carboxylic group, having 9 to 11 carbon atoms per molecule, monocarboxylic acids (sold under the trade name "Versatic 911") and 3.5 kg. of vinyl acetate were charged into the polymerization vessel described in Example 1. After replacement of the air by nitrogen, the contents of the pressure vessel were heated up to 65° C. under stirring, which is continued to the end of polymerization. Then, a solution of 15 gm. of sodium formaldehydesulfoxylate in 500 ml. water were charged into the pressure vessel within a period of 4 hours. Finally, the contents of the pressure vessel were heated up to 85° C. for 1 hour. The polymerizate dispersion thus obtained is free from beads and other undesired components.

EXAMPLE 5

First, 4.2 kg. of water, then 150 gm. of poly-N-vinylpyrrolidone with a K-value of 60, 10 gm. of hydroxyethylcellulose as described in Example 1, 100 gm. of nonylphenol polyethyleneglycol ether with 23 ethyleneoxide units per molecule, 8 gm. of sodium bicarbonate, 10 gm. of potassium persulfate, 200 gm. of vinyl laurate and 800 gm. of vinyl acetate were charged into the polymerization vessel described in Example 1. After replacement of the air by nitrogen, the contents of the pressure vessel were heated up to 75° C. under stirring, which is continued to the end of the polymerization. Then, a mixture of 3,200 gm. of vinyl acetate and 800 gm. of vinyl laurate was charged into the pressure vessel within a period of 2 hours. Finally, the contents of the pressure vessel were heated up to 85° C. for 1 hour. The polymerizate dispersion thus obtained is free from beads and other undesired components.

Comparison Example A

The procedure described in Example 1 was repeated with the difference that no hydroxyethylcellulose was used in the recipe. The polymerizate dispersion thus obtained contained undesired agglomerates.

Comparison Example B

The procedure described in Example 1 was repeated with the difference that no polyvinylpyrrolidone was used in the recipe and in place of 20 gm. of hydroxyethylcellulose, 70 gm. of hydroxypropylmethylcellulose was used.

Comparison Example C

The procedure described in Example 2 was repeated with the difference that no hydroxypropylmethylcellulose was used in the recipe. The polymerizate dispersion thus obtained contains undesired agglomerates.

Comparison Example D

The procedure described in Example 2 was repeated with the difference that no polyvinylpyrrolidone was used in the recipe and in place of 20 gm. of hydroxypropylmethylcellulose, 80 gm. of hydroxypropylmethylcellulose was used.

Comparison Example E

The procedure described in Example 2 was repeated with the difference that in place of 20 gm. of hydroxypropylmethylcellulose, 60 gm. of hydroxypropylmethylcellulose, that is, more than 0.8 weight percent of water-soluble hydroxyalkylcellulose with respect to the weight of compounds which are to be polymerized, were used.

Comparison Example F

The procedure described in Example 3 was repeated with the difference that no hydroxyethylcellulose was used in the recipe. The polymerizate dispersion thus obtained contains many bead-like components as well as undesired agglomerates.

Table I resumes the results obtained from the various examples.

TABLE I

| Example | Viscosity,[1] cp. | Structural viscosity factor | Stirring resistance,[2] cp. | Pigment compatibility [3] | Appearance of the film prepared by drying of the dispersion | Appearance of the film upon storage in water according to time in minutes indicated below |
|---|---|---|---|---|---|---|
| 1 | 20,000 | 5.5 | 15,000 | Very good | Free from specks | Slight turbidity after 4 minutes. |
| 2 | 14,000 | 5.6 | 12,000 | ....do | ....do | Slight turbidity after 5 minutes. |
| 3 | 10,000 | 5.0 | 9,000 | ....do | ....do | Almost no turbidity after 60 minutes. |
| 4 | 20,000 | 6.0 | 18,000 | ....do | ....do | Slight turbidity after 6 minutes. |
| 5 | 35,000 | 5.8 | 32,000 | ....do | ....do | Slight turbidity after 4 minutes. |
| A | 35,000 | 5.0 | 10,000 | Poor | Specky | Slight turbidity after 5 minutes. |
| B | 16,000 | 2.5 | 13,000 | Very good | Almost free from specks | White immediately. |
| C | 25,000 | 5.0 | 8,000 | Good | Specky | Slight turbidity after 5 minutes. |
| D | 12,000 | 2.0 | 8,000 | ....do | Almost free from specks | White immediately. |
| E | 20,000 | 2.5 | 17,000 | ....do | ....do | Do. |
| F | 60,000 | 4.5 | 600 | ....do | Specky | Almost no turbidity after 120 minutes. |

[1] Measured in the Bookfield viscosimeter at 10 revolutions per minute at 20° C.
[2] Viscosity measured in the Bookfield viscosimeter at 10 revolutions per minute at 20° C. after 10 minutes stirring with 2,000 revolutions per minute at 20° C. and 24 hours of rest.
[3] Determined the following way: 200 gm. of a mixture of 92 parts by weight dispersion, 46 parts by weight zinc white-(ZnO)-greenseal, 0.5 parts by weight pigment distributor (ammonia salts of polycarbon acids) and 65 parts by weight water is homogenized in a rolling mill and attention is paid to how much and whether coagulum forms in the funnel tube and remains there. If no coagulum has been observed, the pigment compatibility is very good.

This Table I demonstrates the unexpected properties of the polymerizate dispersions of the invention, particularly with reference to the comparison polymerizate dispersions.

The preceding specific embodiments are illustrative of the practice of the invention. It is to be understood, however, that other expedients known to those skilled in the art or disclosed herein can be utilized without departing from the spirit of the invention or the scope of the appended claims.

We claim:

1. In a process for the preparation of aqueous polymerizate dispersions comprising the steps of effecting a dispersion of free-radical polymerizable organic compounds selected from the group consisting of vinyl esters of acetic acid and mixtures of vinyl acetate with vinyl esters of alkanoic acids having 4 to 18 carbon atoms, vinyl chloride, ethylene and diesters of alkenedioic acids with alkanols in the presence of 0.6% to 4% by weight, based on the weight of said polymerizable organic compounds, of a polymerizate of N-vinylpyrrolidone having a K-value from 30 to 90, 0.1% to 8% by weight, based on the weight of said polymerizable organic compounds, of non-ionic emulsifiers selected from the group consisting of block-mixed polymerizates of ethylene oxide and propylene oxide and ethylene oxide adducts containing from 4 to 100 mols of ethylene oxide adducted to 1 mol of an organic compound having at least 8 carbon atoms and active hydrogen atoms, and from 0 to 1% by weight, based on the weight of said polymerizable organic compounds, of anionic emulsifiers selected from the group consisting of alkali metal and ammonium salts of (1) secondary alkane sulfonic acids having 10 to 18 carbon atoms, (2) acid sulfuric acid esters of alkanols having 9 to 18 carbon atoms, (3) alkylarylsulfonic acids, (4) sulfonated polyoxyethylene ethers of alkylphenols, and (5) dialkyl esters of sulfosuccinic acid, and recovering said aqueous polymerizate dispersions, the improvement which consists of effecting said dispersion polymerization in the presence of about 0.1% to about 0.8% by weight, based on the weight of said polymerizable organic compounds, of a water-soluble hydroxyalkylcellulose having a viscosity, as measured with a 2% by weight aqueous solution at 20° C., of 6 to 1000 cp.

2. The process of claim 1 wherein the amount of said polymerizate of N-vinylpyrrolidone employed is greater than the amount of said water-soluble hydroxyalkyl cellulose employed.

3. The aqueous polymerizate dispersion produced by the process of claim 1.

References Cited

UNITED STATES PATENTS

| | | | |
|---|---|---|---|
| 3,231,534 | 1/1966 | Blades et al. | 260—29.6 |
| 3,244,658 | 4/1966 | Grosser et al. | 260—29.6 |
| 3,324,056 | 6/1967 | Vona et al. | 260—17 |
| 3,513,120 | 5/1970 | Pohlemann et al. | 260—29.6 |

WILLIAM H. SHORT, Primary Examiner

L. M. PHYNES, Assistant Examiner

U.S. Cl. X.R.

260—29.6T, 29.6TA, 29.6MQ, 29.6MN, 29.6RB